(No Model.) 4 Sheets—Sheet 1.
J. F. PFEFFER & E. SPENCER.
REGISTERING APPARATUS FOR KEY OPERATED MACHINES.

No. 423,272. Patented Mar. 11, 1890.

Witnesses
Chas. J. Williamson.
Henry C. Hazard.

Inventors
John F. Pfeffer & Elijah Spencer
by Prindle and Russell
their Attorneys (No Model.) 4 Sheets—Sheet 3.
J. F. PFEFFER & E. SPENCER.
REGISTERING APPARATUS FOR KEY OPERATED MACHINES.

No. 423,272. Patented Mar. 11, 1890.

Witnesses
Chas. J. Williamson
Henry C. Hazard

Inventors
John F. Pfeffer & Elijah Spencer
by Prindle and Russell
their Attorneys (No Model.) 4 Sheets—Sheet 4.

J. F. PFEFFER & E. SPENCER.
REGISTERING APPARATUS FOR KEY OPERATED MACHINES.

No. 423,272. Patented Mar. 11, 1890.

Witnesses
Chas. J. Williamson.
Henry C. Hazard.

Inventors
John F. Pfeffer and Elijah Spencer
by Prindle and Russell
their Attorneys

UNITED STATES PATENT OFFICE.

JOHN F. PFEFFER, OF CINCINNATI, AND ELIJAH SPENCER, OF DAYTON, OHIO; SAID SPENCER ASSIGNOR TO SAID PFEFFER.

REGISTERING APPARATUS FOR KEY-OPERATED MACHINES.

SPECIFICATION forming part of Letters Patent No. 423,272, dated March 11, 1890.

Application filed June 22, 1889. Serial No. 315,267. (No model.)

*To all whom it may concern:*

Be it known that we, JOHN F. PFEFFER, of Cincinnati, in the county of Hamilton and State of Ohio, and ELIJAH SPENCER, of Dayton, in the county of Montgomery, and in the State of Ohio, have invented certain new and useful Improvements in Registering Apparatus; and we do hereby declare that the following is a full, clear, and exact description thereof, reference being had to the accompanying drawings, in which—

Figure 1:
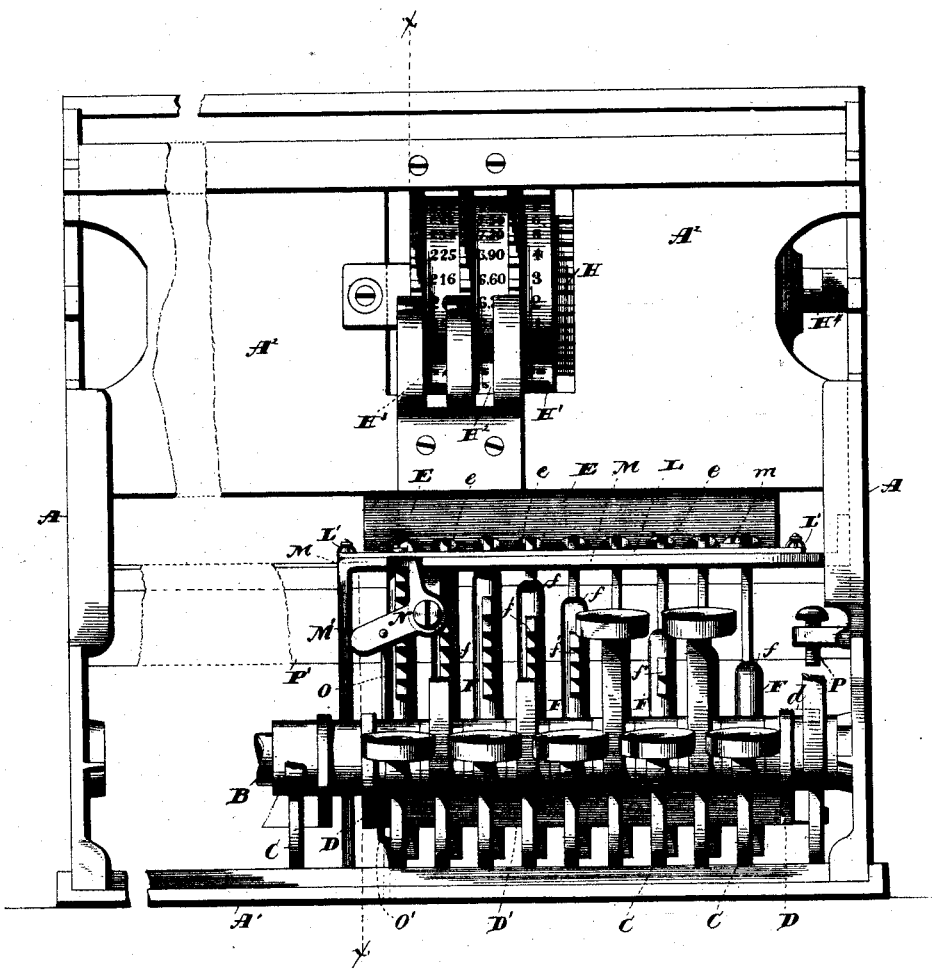
Figure 2:
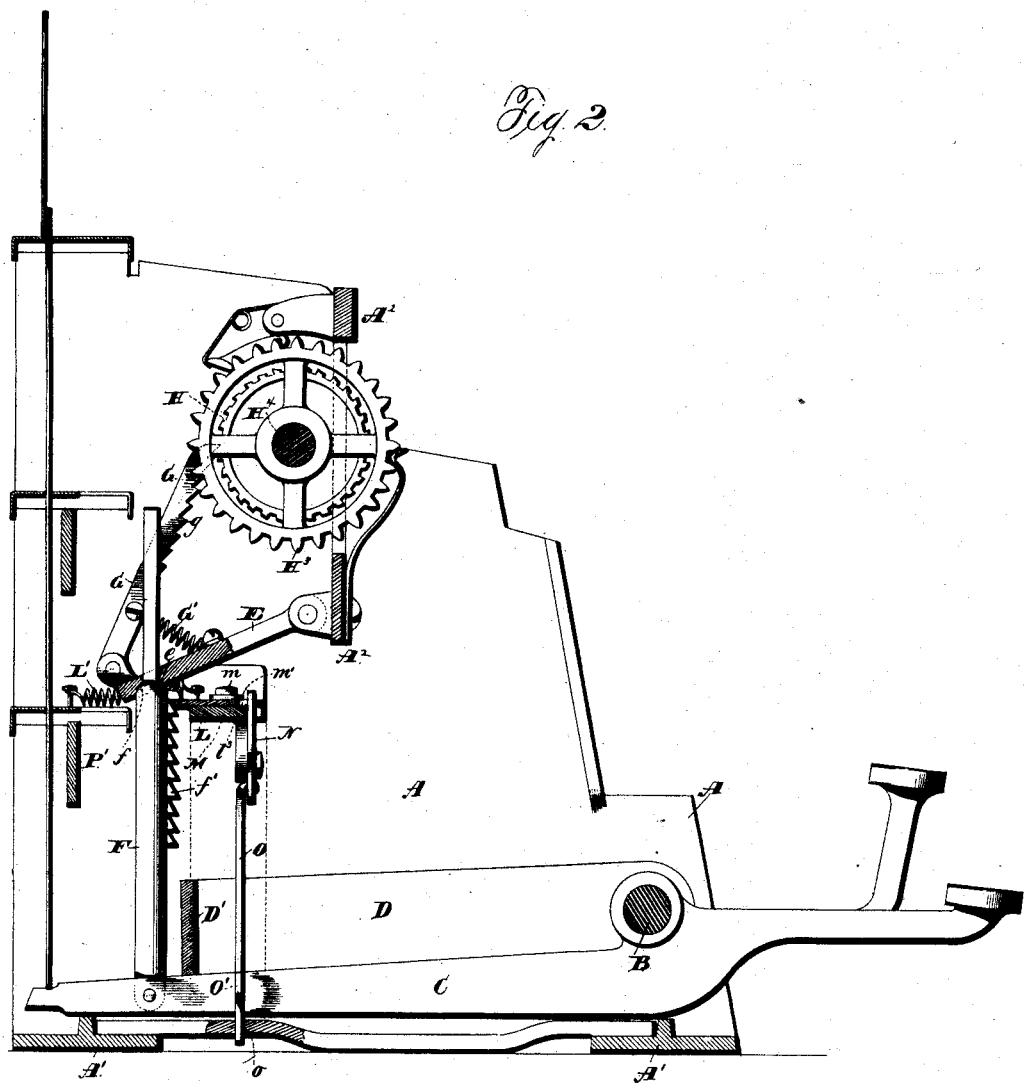
Figure 3:
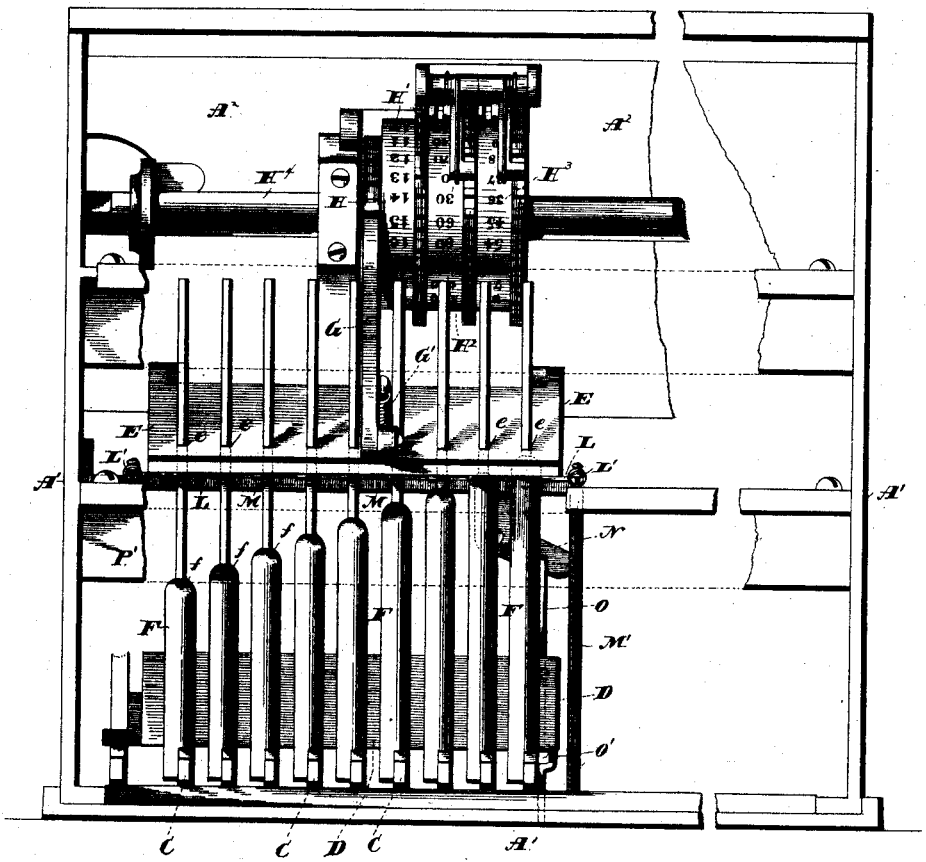
Figure 4:
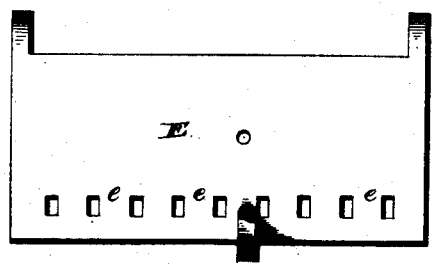
Figure 5:
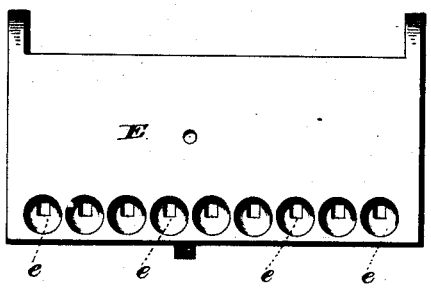
Figure 6:
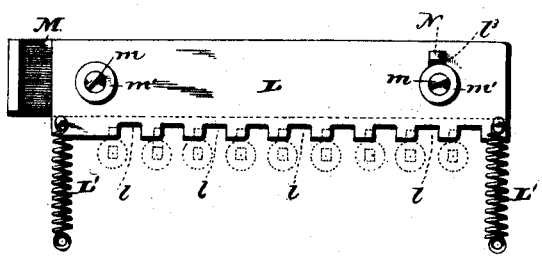
Figure 7:
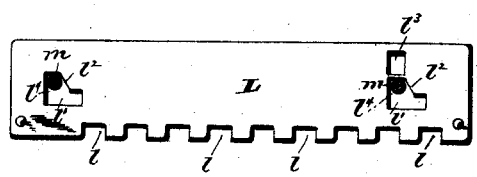
Figure 8:
Figure 9:

Figure 1 shows a view of our mechanism in front elevation; Fig. 2, a vertical section of the same on line $x\ x$ of Fig. 1; Fig. 3, a detail view of the same in rear elevation; Fig. 4, a detail top plan view of the swinging plate carrying the register-wheel actuating-pawl; Fig. 5, a bottom plan view of the same; Fig. 6, a detail top plan view of the mechanism for insuring full movement of the keys; Fig. 7, a similar view of the sliding pawl-plate; Fig. 8, a detail perspective view of one of the rods connected with and actuated by the keys, and Fig. 9 a similar view of a modified form of such rod.

Letters of like name and kind refer to like parts in each of the figures.

The object of our invention is to provide certain improvements in registering mechanism adapted for use in cash registers and indicators, calculators, and other machines using registering or recording devices actuated by a series of keys or movable pieces; and with this end in view our invention consists in the mechanism and in the construction, arrangement, and combination of the parts thereof, as hereinafter specified.

While we shall show and describe our registering apparatus as applied to a cash register and indicator, we desire it to be understood that, as indicated above, we do not limit ourselves to such application, but contemplate making use of parts or the whole of our apparatus in any machine having either recording or registering devices to be caused to record or register different amounts by the movements of the different elements of a series of movable actuating pieces or keys.

In the drawings, A A designate the side frame-plates of ordinary construction used in cash registers and indicators, such plates being connected together in the well-known way by the two transverse bottom bars $A'\ A'$, and the upper plate $A^2$, upon which the register-wheels or other registering or recording devices are to be supported.

Supported at its opposite ends in the plates A A is the shaft B, upon which are pivoted the usual key-levers C C, of any desired number, according to the different amounts to be registered or recorded.

As it appears in the drawings, the machine is of the kind in which the whole number of keys is divided up into different series, each series being intended to cause registration and indication of a certain series of different amounts. In such machine we have shown our registering mechanism as applied to only one of the series of keys, but it will be understood that a similar arrangement of mechanism can be used with the other series; or, if desired, instead of having two of such mechanisms one can be employed extending across or adapted to be actuated by the whole number of keys.

Pivoted on the shaft B at opposite ends of the series of key-levers to which our mechanism is applied are the arms D D of a swinging frame, which has a cross-bar $D'$ extending across and resting upon the rear portions of such levers, so that the frame will be raised by the movement of any lever. This frame, which is used in connection with our registering mechanism for a purpose to be described hereinafter, can also be employed to actuate any desired form of alarm-sounding device, when any key is raised to its full height, to cause a full registration or a registration and indication where indicating devices are provided for actuation by the keys. Such alarm device we have not shown in the drawings, as it is not essential to our mechanism covered in the present case, and as its form and operation when it is used will be fully understood by those familiar with cash registering and indicating mechanism.

Pivoted to the frame-plate $A^2$, above the series of keys in connection with which our registering mechanism is used, is a swinging plate E, having the series of openings $e$, one for each lever, countersunk on the under side of the plate, as shown. The countersink is preferably a round or spherical one, but, as will appear hereinafter, may be of other forms, if desired.

Pivotally connected at its lower end with each key-lever is a rod F, having its upper end passing up through one of the openings $e$ in plate E. Each rod is provided with a shoulder $f$, adapted, as the rod is raised, to come in contact with and move the plate E, the shoulders on the different rods of the series being set or situated at different heights, so as to strike and begin moving the plate at different points in the full upward movement of the rods by the key-levers. The difference between the heights of the shoulders on contiguous rods is proportioned to the difference between the amounts to be registered by the respective keys. The shoulder on the rod attached to the key for registering the largest amount is the highest, while the rod actuated by the key for registering the lowest amount has the lowest shoulder. The shoulders on the intermediate rods are, starting with the one next to the rod having the highest shoulder, arranged successively lower and lower by a certain fraction of the distance between the heights of the highest and lowest shoulder. Where the amounts to be registered differ in size with a regular variation, the difference between the heights of contiguous rod-shoulders is a regular one throughout the series. With this arrangement and the plate normally situated above the highest rod-shoulder, as the rods are raised to the full extent of their equal upward movements by their respective keys, the one with the highest shoulder will raise the plate E the most, the next rod will raise it less, and so on through the series of rods, the last one raising the plate the least, because its shoulder is the lowest and does not reach the plate until the rod has moved nearly throughout its whole possible travel. The plate E can, when down in its normal position, be supported in any desired way; but we prefer to have it in contact with and resting upon the highest shoulder on the series of rods, as indicated in the drawings. Each shoulder is preferably rounded on its upper side, as shown, so as to fit the countersink around its respective opening $e$ in the swinging plate. The shape of the rods can be varied as desired without departure from our invention. Each rod can be round or angular in cross-section, and can be made of a rod with a nut or collar fastened thereon for a plate-engaging shoulder. We prefer, however, the form of rod shown in Fig. 8, with the reduced upper portion passing through the respective opening $e$ in plate E, and the rounded plate-engaging shoulder formed at the upper end of the larger lower part. As the key-levers and the plate E swing upon different axes parallel with each other, it is necessary to provide for a slight swinging of the rods F F with reference to the plate, as such rods and plate rise and descend. We therefore prefer to make each opening $e$ elongated in a radial plane with reference to the swing of the plate. Where the countersink is carried well up into the plate, so as to leave but a thin portion of the latter around the opening, such elongation of the openings $e$ needs only to be very slight to allow all necessary relative movement of rods and plate.

Instead of having a round or spherical countersink for each opening $e$, we contemplate cutting a rounded groove on the under side of the plate extending clear across the series of openings. The rounded shoulders on the rods will then engage the groove at the front and rear sides of the respective openings.

As the swing of the rods with reference to plate E is always in a plane at right angles to the swing of the plate, the plate-engaging shoulder on each rod need not extend around to the sides of the rod, but can be, if desired, only at the rear and front of the reduced portion of the rod, or at either the rear or front side alone. In such case the countersink can be either hemispherical, made by the groove, as described, or shaped to fit the particular form of shoulder used.

Pivotally connected with the plate E, at or near the outer edge, is an upwardly-projecting pawl G, provided on its forward face with a series of ratchet-teeth $g$ $g$, adapted to engage the correspondingly-shaped teeth on the ratchet-wheel H, which latter is attached to or connected with one of a series of register-wheels H' H² H³, journaled upon a suitable shaft H⁴, supported on plate A². A spring G', attached to the plate E and the pawl G, serves to hold the latter in engagement with ratchet-wheel H, so that at each upward movement of the plate the pawl will turn the wheel a certain number of teeth, or through a distance proportional to the amount of motion of the plate.

Any desired form of registering devices to be actuated by the pawl on plate E, so as to register different amounts, according to the different movements of the plate by the different keys and connected rods, can be used without departure from our invention. As shown in the drawings, the registering devices consist of the three wheels H' H² H³, with the first one attached to and turning with ratchet-wheel H.

With the several wheels any of the well-known carrying devices for carrying or continuing the registration from one wheel to the other can be employed, as will be understood by those familiar with registering, calculating, or adding mechanism. The carrying devices shown in the drawings we do not claim as our invention, and therefore need not describe herein in detail.

As indicated hereinbefore, recording devices can be used in connection with the keys, shouldered rods, and pawl-carrying swinging plate, to be actuated thereby in substantially the same way as the registering devices.

In order to insure that when any key is moved to make a registration it shall be raised to its full extent, so as to complete its registration before it can be returned to its lowest position again, we provide each rod F with a series of ratchet-shaped teeth $f'$ $f'$, whose abrupt sides face downward. As shown, these teeth are on the forward sides of the rods in position to be engaged by the rear edge of the plate L, extending across in front of the series of rods and drawn rearward toward them by the springs L' L', one at each end of the plate. With this construction, as any rod is raised the plate will be forced forward against the stress of the spring by the inclined faces of the successive ratchet-teeth on the rod, and will be drawn back under the abrupt side of each successive tooth as such tooth passes up above the plate edge. The spring-actuated plate is then a spring-pawl, adapted to act in conjunction with the several toothed rods of the series, so that as any rod is raised to carry one of its teeth above the plate the edge of the latter will, by coming under the abrupt side of such tooth, effectually prevent the return or downward movement of the rod. The latter is then free to move only upward in a direction to complete its register-actuating movement of the plate E.

In order that any rod, when raised to its full height, may be free to return to its normal depressed position again, the pawl-plate L is made longitudinally movable with reference to the series of rods as well as to and from such series, as described above, and its rear edge is provided with the series of notches $l\, l$, one for each rod, situated out of line with or to one side of the respective rods when the plate is in its normal rod-tooth engaging position. With such arrangement by longitudinal movement of the plate from its said normal position the notches $l\, l$ can be brought opposite to the rods, so that the plate edge no longer stands in the path of the ratchet-teeth on the rods and any raised rod is free to descend.

The pawl-plate L can be supported and guided in any desired or suitable way without departure from our invention. As shown it rests and slides upon the horizontal bar M, supported at one end from one of the side frame-plates A and at the other by an upright or standard M', in turn suitably supported from one of the frame-bars A' or a plate extending between such bars A' A'.

Upon bar M the pawl-plate is held, so as to be capable of its required movements, by the screws $m\, m$ on bar M, passing through slots $l'\, l'$ in the plate, and washers $m'\, m'$, held by such screws down upon the top of the plate. The forward sides of the slots by engaging the screws limit the rearward movement of the plate under stress of springs L' L', so that the forward ends of notches $l\, l$ in the plate cannot be brought into the paths of the teeth on the rods.

As shown best in Fig. 7, from the portion of each slot which is engaged or occupied by the respective screw $m$ when the plate L is drawn rearward in its normal position for engagement of the teeth $f'\, f'$ on the rods F F, an inclined shoulder $l^2$ extends rearward and to one side at an angle to the movement of the plate by the springs L' L'. Such inclined shoulders, which lead to rear portions of the respective slots extending longitudinally with reference to the plate, serve by engagement with the screws $m\, m$ to insure that the plate, as it is drawn toward the series of toothed rods, shall always take its proper normal rod-tooth engaging position.

To trip the plate L, or give it the requisite longitudinal movement to disengage it from the teeth of any raised rod and bring its notches opposite the respective rods when any key and rod has been raised to the full extent, so as to make a complete registration for such rod and key, there is pivoted to an arm or lug on the plate-supporting bar M an elbow-lever N, having its upright arm engaging a slot $l^3$ in the plate L. Such slot extends at right angles to the plate in order to allow of the necessary movement of the plate to and from the series of rods as any rod-teeth ride up past the rear edge of the plate, and the springs L' L' draw the plate toward the series of rods. The other arm of lever N is in position to be struck and actuated by the swinging frame D D' D as such frame reaches the limit of its possible upward movement by any raised key. The swing of the lever through the engagement of its upright arm with the slot in plate L then moves the latter longitudinally a sufficient distance to bring the notches $l\, l$ opposite the respective rods F F in the paths of the teeth on such rods.

Connected with the plate-actuating lever N is a rod O, carrying a shoulder O' adapted to be engaged and forced down by the frame D D' D as it returns to its lowest position. Such rod is, as shown in the drawings, connected at its upper end with the arm of the lever which the frame engages at the end of its upward swing. Its shoulder O' is so situated below the frame that, as the rod is raised by the movement of the lever N to trip the plate L, it will stand in position to be struck and carried downward by the frame as the latter descends to its lowest position after being raised. The lower end of the rod can be guided in any desired way or by any suitable means. As shown, it enters and is guided in a hole $o$ in the frame-plate which supports the upright or standard M.'

In order that the different rods shall move the register-actuating pawl carrying plate E through different distances proportional to the different heights of the rod-shoulders, the rods should all have equal movement. Any suitable means for securing this equality of movement can be employed without departure from our invention. If desired, a bar P' can, as shown in the drawings, be so arranged that its lower edge will act as a stop for the rear ends of the key-levers, or the upward swing of the frame D D' D can be limited by a suitable abutment or stop device. As the bar D' of the frame extends across the series of key-levers, the latter arrangement would insure the same limit of upward swing for all the levers. Such stop for the frame can, as indicated in Fig. 1, be an adjustable one, consisting of a set-screw P on a suitable lug on one of the side frame-plates A and adapted to engage a suitable bearing $d$ on swinging frame.

Where it is desired only to prevent premature descent of a key and rod after the shoulder on the latter has engaged and commenced to move the swinging register-actuating plate E and not to prevent return movement of the key and rod before the plate is engaged and the registration commenced, the arresting ratchet-teeth on the different rods can be arranged so as not to reach or come into engagement with the pawl-plate L until the respective rods have been raised to bring their shoulders into engagement with plate E. The rod with the lowest shoulder need then have but one or two ratchet-teeth to be engaged by pawl-plate L as the rod approaches the upper limit of its movement. Starting from this rod, the successive rods would then have successively longer and longer series of ratchet-teeth extending farther and farther up the rods.

The number of teeth on each rod can be made proportionate to the number of spaces through which the register-wheel is to be moved by the pawl-carrying plate E, as actuated by the shoulder on such rod. With this arrangement the rod will at each step in its register-operating movement be arrested from any back motion or descent as long as the pawl-plate L is in position to engage the rod-teeth.

We contemplate using our registering mechanism in connection with means for preventing the movement of more than one key and rod at a time; but as such key-arresting means forms no part of our invention and can be used or not, as desired, we do not describe or show the same herein.

Any of the known key-arresters used in calculators, registers, and indicators, or type-writers can be employed in connection with the series of key-levers without interfering with or altering the operation of our mechanism, which is, briefly, as follows: With the key-levers and connected rods, and the key-engaging swinging frame D D' D down in their normal positions the register-actuating plate E is also down, resting upon or in contact with the highest shoulder on the key-rods F F. The lever N is then, by the engagement of the frame D D' D with the shoulder O' on rod O, held swung so as to bring the pawl-plate L into proper position for engagement of the teeth $f f$ on any rod F which may be raised. If, now, a registration is to be made or a combined registration and indication, where both registering and indicating devices are used with the keys, the key-lever for registering the desired amount is actuated. The movement of the key raises its connected rod F, so that the shoulder on the latter engages and moves the plate E an amount dependent upon the height of the rod-shoulder. As the rod rises, its ratchet-teeth $f' f'$ ride past the engaging rear edge of the spring-pressed plate L, which by the action of the springs L' L' is drawn under each successive passing tooth, so as to block the downward path of such tooth and thus prevent return movement of the rod. Meanwhile the swinging frame D D' D is raised by the moving key to release the shoulder O' on the rod O, connected with the lever N, for moving plate L longitudinally. As the springs L' L' draw the plate directly rearward toward the series of key rods F F, there is no tendency on their part to move the plate longitudinally out of its proper normal position for engaging the teeth on any raised rod. If by accident there should be any tendency to longitudinal movement on the part of the plate as a key-rod is being raised, the engagement of the inclined shoulders $l^2$ with the screws $m\ m$ will, as the plate is drawn rearward under any ratchet-tooth on the rod, cause such plate to immediately take its normal tooth-engaging position. At each rearward movement of the plate the latter will then always be in its proper place, with its notches $l\ l$ opposite the spaces between the key-rods. As the raised key reaches the upper limit of its motion to complete the registration, or registration and indication, it causes the frame D D' D raised by it to strike and move lever N so as to move the pawl-plate L longitudinally over, so as to bring the notches $l\ l$ in its rear edge over opposite the key-rods in the paths of the teeth $f' f'$ on the latter. As this movement of the plate disengages its edge from the teeth of the raised rod, such rod and its connected key-lever are now free to descend to their normal positions again after having completed their register-actuating movement. As the lever N trips the plate L or draws it into its inoperative position, the inclines $l^2\ l^2$ on the plate riding past the screws $m\ m$ force the plate forward against the stress of the springs L' L' until the longitudinal portions $l^3\ l^3$ of the slots come opposite and are engaged by the guide-screws. As the stress of the springs L' L' upon the plate is in a direction at right angles to the sides of these slot portions, there is no tendency to movement of the plate longitudinally in one direction or the other, and the plate will remain in its inoperative position until actuated again by the lever N. As the raised key approaches the end of its downward movement, the frame D D' D, descending with it, strikes the shoulder O' on rod O, and, drawing such rod down, swings the lever to move the pawl-plate L longitudinally, so as to bring the notches in its rear edge opposite the spaces between the key-rods again. As the plate is thus moved by the lever, it is also drawn rearward by the action of its springs L' L' as soon as the screws $m$ $m$ become disengaged from the longitudinal portions $l^4$ $l^4$ of the respective slots. The engagement of the inclines $l^2 l^2$ with the screws $m$ $m$ will then, as the plate is drawn to the rear by the stress of the springs, insure the full movement of the plate into its normal position again and its remaining in such position until tripped or actuated by lever N again. The upward swinging of plate E by the engagement of the shoulder on the raised rod with the countersink around the respective rod-opening $e$ in the plate causes, through the engagement of the toothed spring-pressed pawl G, carried by the plate with the ratchet-wheel H, a turning of the register-wheel H' through a number of teeth or spaces proportioned to the amount of movement of the plate, and so to the height of the shoulder on the raised rod.

As indicated hereinbefore, where the difference between the heights of the shoulders on contiguous key-rods is a regular one, the amounts of swing of the plate E and consequent movements of the registering or recording devices, as the keys are successively operated, will be made successively greater or smaller by a regular ratio of increase or decrease. Where, as in the mechanism shown in the drawings, there are nine keys to cause registration of nine different amounts, increasing from right to left successively by the same given amount, the heights of the shoulders on the respective key-rods F F increase regularly in height from the right to the left of the series of rods. With the plate E resting upon or engaging the highest shoulder on the rod at the left of the series, and the rods all having the same amount of upward movement, as provided for in our apparatus, the highest shouldered rod will raise the wing through the whole extent of its movement; the next rod will move through one-ninth of its whole movement before its shoulder engages the plate E, and, consequently, will move such plate one-ninth less than the first rod; the next will not actuate the register-operating plate until it has traveled through two-ninths of its possible motion, and, consequently, will swing the plate only seven-ninths as much as the first rod, and so on throughout the series, the last rod traveling through eight-ninths of its upward motion before its shoulder reaches and actuates plate E.

Any number of keys with connected rods can be used, the respective plate-engaging shoulders on the rods being relatively situated to suit the number of different amounts to be registered, or registered and indicated, and the difference in the heights of the shoulders corresponding with the variation in such amounts.

Having thus described our invention, what we claim is—

1. In mechanism for actuating registering or recording devices, a swinging plate adapted to be connected with such devices and a series of rods having shoulders at different distances from the plate adapted to engage the latter as the rods are moved, substantially as and for the purpose specified.

2. In mechanism for actuating registering or recording devices, a swinging plate provided with a series of openings and a series of rods passing through such openings provided with plate-engaging shoulders arranged at different distances from the plate on the different rods, substantially as and for the purpose shown.

3. In combination with the swinging plate adapted to be connected with suitable registering or recording devices so as to actuate the same and provided with a series of openings, a series of keys, and a series of rods connected with such keys and having shoulders arranged on the different rods at different distances from the plate, substantially as and for the purpose set forth.

4. In combination with the swinging plate provided with a series of openings, the series of rods passing through such openings and having plate-engaging shoulders at different heights, a series of keys connected with the rods so as to actuate the same, and means for insuring equal movement of different rods and keys, substantially as and for the purpose described.

5. In combination with the swinging plate provided with a series of openings, the series of rods passing up through such openings and having plate-shoulders arranged below the plate at different heights on the different rods, a series of pivoted key-levers, and pivotal connections between the rods and the key-levers, substantially as and for the purpose specified.

6. In combination with the series of key-levers and the series of rods connected therewith provided with shoulders at different heights on the different rods, the swinging plate having the series of openings through which the rods pass, adapted to allow swing of the rods and plate with reference to each other, substantially as and for the purpose shown.

7. In combination with the series of key-levers and the series of rods connected therewith having shoulders at different heights on the different rods, the swinging plates having openings through which the rods pass, made larger than the rods passing through them and countersunk to receive the shoulders on the rods, substantially as and for the purpose set forth.

8. In combination with the swinging plate provided with the series of countersunk openings, the series of rods having at different heights on the different rods rounded shoulders to engage the countersinks in the plate, and a series of key-levers to which the rods are pivotally connected, substantially as and for the purpose described.

9. In combination with the series of keys and the series of shouldered rods connected therewith, with the shoulders on the different rods at different heights, a swinging plate adapted to be engaged by the rod-shoulders, a toothed pawl carried by the plate, and a ratchet-wheel engaged by the pawl, substantially as and for the purpose specified.

10. In combination with the series of key-levers and the series of rods connected therewith having shoulders at different heights on the different rods, the swinging plate having the series of openings through which the rods pass, a toothed pawl carried by the plate, and a ratchet-wheel engaged by such pawl, substantially as and for the purpose shown.

11. In combination with suitable registering devices having a ratchet-wheel for operating them, the swinging plate provided with the series of openings, the toothed pawl carried by the plate and engaging the ratchet-wheel, a series of rods passing through the openings in the plate and provided with plate-engaging shoulders situated on the different rods at different distances from the plate, the series of keys connected with and actuating such rods, substantially as and for the purpose set forth.

12. In combination with a series of keys, a series of ratchet-toothed rods connected with the keys, and a locking device adapted to engage the teeth on any rod moved from its normal position, substantially as and for the purpose described.

13. In combination with a series of keys, a series of ratchet-toothed rods connected with the keys, and a spring-pressed plate adapted to engage the teeth on any moved rod, substantially as and for the purpose shown.

14. In combination with a series of keys, a series of ratchet-toothed rods, a spring-pressed pawl-plate having portions to engage the teeth on the rods as the latter are moved, and means for tripping the plate to move it out of the paths of the teeth on the rods, substantially as and for the purpose set forth.

15. In combination with a series of keys, a series of ratchet-toothed rods connected therewith, a spring-pressed pawl-plate adapted to engage the teeth on any rod raised, and means for tripping such plate out of its tooth-engaging position when a rod has been raised a certain predetermined height, substantially as and for the purpose described.

16. In combination with a series of ratchet-toothed rods, a pawl-plate extending across such series and having its edge provided with a series of notches adapted to be brought into and out of the path of the ratchet-teeth on the rods by longitudinal movement of the plate, and springs drawing the plate toward the series of rods, substantially as and for the purpose shown.

17. In combination with a series of keys and a series of ratchet-toothed rods connected therewith, the notched pawl-plate, springs drawing such plate toward the toothed rods, and means adapted to be actuated by any key to move the plate longitudinally in opposite directions at opposite ends of the travel of the key, substantially as and for the purpose specified.

18. In combination with the series of keys and the series of ratchet-toothed rods connected with the keys, the notched pawl-plate extending across the series of toothed rods, springs drawing such plate toward the rods, and a lever connected with the plate so as to move it longitudinally, substantially as and for the purpose shown.

19. In combination with the series of keys and the series of ratchet-toothed rods connected therewith, the pawl-plate extending across the series of rods and having its rod-tooth engaging edge-notched springs, forcing the plate toward the rods, a movable frame adapted to be moved by any key, the lever for moving the pawl-plate longitudinally, and suitable connecting means between the lever and the frame, whereby the latter swings the former in opposite directions at opposite ends of its own travel, substantially as and for the purpose set forth.

20. In combination with the series of keys and the series of ratchet-toothed rods connected with the keys, the spring-pressed pawl-plate with notched edge, the lever connected with such plate, the swinging frame adapted to be moved by any key, and the rod attached to the lever and provided with a shoulder to be struck by the frame, substantially as and for the purpose described.

21. In combination with the series of ratchet-toothed rods, the spring-pressed pawl-plate with notched edge drawn by its springs toward the series of rods, suitable guide-screws engaging slots in the plate, and the inclined shoulders on the plate to engage the screws, substantially as and for the purpose specified.

22. In combination with the series of ratchet-toothed rods, the pawl-plate having its edge provided with notches adapted to be brought into and out of the path of the ratchet-teeth on the rods by longitudinal movement of the plate, and having the guide-slots provided with the inclined shoulders, a suitable support for the plate, screws on such support passing through the slots in the plate, and springs drawing the plate toward the series of rods, and means for moving the plate longitudinally, substantially as and for the purpose shown.

23. In combination with the series of ratchet-toothed rods, and the series of keys connected with the rods, the notched plate extending across such series having the slots with longitudinal portions and inclined shoulders extending from such portions, a suitable support for the plate, guides on such support engaging the slots in the plate, a lever connected with the plate so as to move it longitudinally, springs drawing the plate toward the series of toothed rods, a movable frame adapted to be engaged by any key, and suitable connections between the frame and the plate-moving lever, whereby the latter is swung in opposite directions as the frame reaches the opposite limit of its movement, substantially as and for the purpose set forth.

24. In a registering apparatus, in combination with the swinging plate for actuating the registering devices, the series of rods having shoulders at different heights for engaging the plate and ratchet-teeth, a locking device adapted to engage the teeth on any raised rod, and means for disengaging the locking device from the teeth on any rod when the latter is raised to its full height, substantially as and for the purpose described.

25. In a registering apparatus, in combination with the swinging plate for actuating the registering devices, a series of rods having plate-engaging shoulders at different heights on the different rods and ratchet-teeth, a spring-pressed pawl-plate adapted to engage the teeth on any rod raised, and means for disengaging the plate from such teeth as the rod reaches the upper limit of its movement, substantially as and for the purpose specified.

26. In combination with the swinging plate for actuating the registering devices, the series of rods provided with plate-engaging shoulders at different heights and with ratchet-teeth, the spring-pressed pawl-plate for engaging the teeth on any rod raised, the series of keys connected with the rods, a movable frame engaged by such keys, and means for moving the pawl-plate into and out of position for engaging the rod-teeth at opposite ends of the travel of the key-engaged frame, substantially as and for the purpose shown.

27. In combination with the swinging plate for actuating the registering devices, and the series of rods provided with plate-engaging shoulders at different heights, and with series of ratchet-teeth, the notched pawl-plate extending across such series and drawn toward the same by springs, the keys for actuating the rods, a lever engaging the pawl-plate so as to shift it longitudinally, a movable frame extending across the series of keys, and connections between such frame and the plate-shifting lever whereby the frame moves the lever in opposite directions at opposite ends of the frame's movement, substantially as and for the purpose set forth.

In testimony that we claim the foregoing we have hereunto set our hands this 11th day of June, A. D. 1889.

JOHN F. PFEFFER.
ELIJAH SPENCER.

Witnesses:
J. F. TRADER,
CHARLES H. KUMLER.